United States Patent [19]

Imada et al.

[11] 4,310,564

[45] Jan. 12, 1982

[54] METHOD FOR MODIFYING SURFACE PROPERTIES IN POLYVINYL CHLORIDE SHAPED ARTICLES

[75] Inventors: Kiyoshi Imada, Omiya; Susumu Ueno, Ibaraki; Yasuhide Nishina, Ibaraki; Hirokazu Nomura, Ibaraki, all of Japan

[73] Assignee: Shin-Etsu Chemical Co., Ltd., Tokyo, Japan

[21] Appl. No.: 204,195

[22] Filed: Nov. 5, 1980

[30] Foreign Application Priority Data

Nov. 7, 1979 [JP] Japan ................................ 54-144146

[51] Int. Cl.³ .............................................. B05D 3/06
[52] U.S. Cl. ....................................... 427/40; 204/169
[58] Field of Search ....................... 427/38, 39, 40, 41; 204/164, 165, 168, 169

[56] References Cited

U.S. PATENT DOCUMENTS

| | | | |
|---|---|---|---|
| 3,870,610 | 3/1975 | Baird et al. | 204/165 |
| 4,091,166 | 5/1978 | Kubacki | 427/40 |
| 4,187,331 | 2/1980 | Ma | 427/41 |
| 4,247,440 | 1/1981 | Asai et al. | 204/165 |
| 4,265,276 | 5/1981 | Hatada et al. | 204/165 |

*Primary Examiner*—John H. Newsome
*Attorney, Agent, or Firm*—Toren, McGeady & Stanger

[57] ABSTRACT

The undesirable phenomenon of bleeding of, for example, a plasticizer contained in a shaped article of a plasticized polyvinyl chloride resin on the surface of the article in a long-run use is effectively prevented by the inventive method and the effectiveness of the method is durable over a long period of time even when the article is used in an outdoor environment or under irradiation with ultraviolet light. The method of the invention comprises the first step of exposing the surface of the article to an atmosphere of low temperature plasma of an inorganic gas and then the second step of contacting the thus plasma-treated surface with a halogen or hydrogen halide, preferably, in gaseous state.

7 Claims, No Drawings

METHOD FOR MODIFYING SURFACE PROPERTIES IN POLYVINYL CHLORIDE SHAPED ARTICLES

BACKGROUND OF THE INVENTION

The present invention relates to a method for modifying surface properties in shaped articles made of a polyvinyl chloride resin or, more particularly, to a method in which the surface of a shaped article of a polyvinyl chloride-based resin is subjected to chemical modification so as that migration and bleeding of a plasticizer or other additive ingredients formulated in the shaped article on to the surface of the shaped article in the lapse of time is prevented effectively or the plasticizer or other additive ingredients thus exuded on the surface of the article are prevented from transfer to the surface of the other body being used in contact with the shaped article of polyvinyl chloride resin.

Needless, to say, vinyl chloride-based resins belong to one of the most inexpensive classes of synthetic resins so that they are used extensively in a large quantity as a resin material for fabricating a variety of shaped articles such as films, sheets, plates and tubes as well as shaped articles of complicated or irregular forms to be used in very much diversified fields of applications.

Vinyl chloride-based resins are, however, rarely fabricated into shaped articles as such but it is a very common practice that a vinyl chloride-based resin is fabricated as formulated with several kinds of additive ingredients. In particular, flexible type shaped articles of vinyl chloride-based resins are fabricated with admixture of a relatively large amount of a plasticizer ranging usually from 15 to 50% by weight of the vinyl chloride-based resin.

One of the unavoidable problems in such a high loading of a plasticizer in shaped articles of flexible type fabricated with a vinyl chloride-based resin is the bleeding of the plasticizer on to the surface of the shaped article in the lapse of time. The plasticizer thus exuded on the surface of a shaped article is naturally transferred to the surface of a second body kept in contact with the plasticizer-formulated shaped article of a vinyl chloride-based resin.

For example, many of electric wires are provided with an insulating layer of a plasticized vinyl chloride-based resin. The plasticizer in the insulating layer migrates toward the surface and dissipates into the atmospheric air, especially, accelerated by heat when the electric wire is used with a relatively large electric current. Such a loss of the plasticizer is of course undesirable for maintaining the good physical properties of the insulating layer. Therefore, the use of a less volatile high polymeric plasticizer is recommended particularly in the formulation for the insulating layers of electric wires.

Further, films and sheets of a plasticized vinyl chloride-based resin are sometimes subject to a serious problem of surface stain by the plasticizer exuded on the surface when, for example, the film or sheet is used as a flooring material or wall material. In addition, a phenomenon of so-called blocking is unavoidable with films or sheets of a plasticized vinyl chloride-based resin when the films or sheets are kept as stacked on each other or as a roll due to the stickiness by the plasticizer exuded on the surface.

Moreover, when a shaped article of a plasticized vinyl chloride-based resin is lastingly kept in contact with certain liquids such as oils and organic solvents, the plasticizer contained in the shaped article is extracted into the liquid in contact therewith so that the content of the plasticizer in the shaped article is decreased leading to lowered physical properties of the shaped article. Such an extraction of the plasticizer into the liquid is disadvantageous, especially, when the shaped articles of the plasticized vinyl chloride-based resin are containers of cosmetic materials, wrapping materials for foodstuff, medical instruments and the like because the extracted plasticizer contaminates a solution containing oil-solubilizing ingredients such as soap solutions, foodstuffs, such as milk and edible oils and physiological liquids such as blood and other body fluids.

Besides, films of plasticized vinyl chloride-based resins are widely used in the fields of agriculture such as in the building of greenhouses but the bleeding of the plasticizer is also undesirable in this case because bleeding of the plasticizer causes blocking of the film or decrease in the transparency of the films to light.

The above explanation is given particularly with respect to the plasticizer bleeding but the other kinds of additives used in the formulation of vinyl chloride-based resins are more or less subject to a similar problem of surface bleeding or blooming.

Various attempts have been made hitherto to solve the above described problems of surface bleeding or blooming of additive ingredients, typically a plasticizer, formulated in shaped articles of a vinyl chloride-based resin.

For example, the use of a high polymeric plasticizer such as polyester-based ones is recommended instead of conventional low molecular weight plasticizers in consideration of the extremely small migration and extractability. Unfortunately, such a high polymeric plasticizer is inferior in its plasticizing effect in addition to the expensiveness in comparison with low molecular weight plasticizers.

Alternatively, a method has been proposed in which the surface of shaped articles of a vinyl chloride-based resin is coated with the other kinds of synthetic resins such as acrylic resins, polyurethane resins, polyamide resins and the like though with disadvantages that such an overcoating is provided only with a burdensome operation in addition to the rather weak mechanical properties of the overcoating layer to become peeled off in a long run use or by contacting with other hard bodies.

Further alternatively, formulation of a considerable amount of certain bleeding-preventing additives is recommended such as an aliphatic acid amide, silicone fluid, silica powder, diatomaceous earth, kaolin, talc and the like in the vinyl chloride-based resin. The effectiveness of this method is not so high as desired and sufficient effects are obtained only with sacrifice of the other advantageous properties possessed inherently by vinyl chloride-based resins.

Recently there have been proposed methods in which the surface of a shaped article of a vinyl chloride-based resin is irradiated with actinic rays such as ionizing radiations, electron beams and ultraviolet light. These methods, however, have their respective problems. For example, ionizing radiations and electron beams cause crosslinking reaction of the polyvinyl chloride molecules not only in the surface layer of the article but also in the depth of the body due to their excessively high energy so that the desirable flexibility of the shaped articles of a plasticized polyvinyl chloride resin is largely lost. Furthermore, the irradiation with ultraviolet light is not free from the problem of coloring of the shaped article as a result of the degradation of the polymer molecules on the surface.

Some of the inventors have recently proposed a method in which the surface of a shaped article of a plasticized polyvinyl chloride resin is exposed to low temperature plasma of a gas so that the bleeding of the plasticizer on the surface of the article is greatly reduced (see Japanese Patent Disclosure No. 55-16004 or U.S. Patent Application Ser. No. 51,150, now allowed). This method of plasma treatment is very advantageous over the other prior art methods in that a highly crosslinked layer is formed on the surface of the treated article without coloration and not affecting the properties of the shaped article such as mechanical strengths.

Despite the outstanding effectiveness of the method of the plasma treatment, however, the method has still a problem that the effect for preventing bleeding or exudation of the plasticizer obtained by the method has rather poor durability. That is, when a plasma-treated article provided with a sufficiently highly crosslinked surface layer is used in an outdoor environment or irradiated with ultraviolet light for a long period of time, the crosslinked layer on the surface is unavoidably subject to degradation leading to the disappearance of the performance for preventing bleeding of the plasticizer. Accordingly, the practicability of the method of the plasma treatment is relatively low when high anti-weathering resistance or anti-ultraviolet resistance is required for the shaped articles such as electric wires for outdoor use, building materials for agricultural greenhouses and the like.

SUMMARY OF THE INVENTION

It is therefore an object of the present invention to provide a novel and improved method for preventing surface bleeding of a plasticizer and other additive ingredients contained in a shaped article of a vinyl chloride-based resin with lasting effectiveness.

Another object of the present invention is to provide a means according to which long-lasting effectiveness is ensured of the method of treatment of a plasticized polyvinyl chloride shaped article with low temperature plasma.

The method of the present invention established as a result of the extensive investigations undertaken by the inventors comprises the steps of (a) exposing the surface of a shaped article of a vinyl chloride-based resin to an atmosphere of low temperature plasma of an inorganic gas under a pressure not exceeding 10 Torr, and (b) contacting the thus plasma-treated surface of the shaped article with a halogen or a hydrogen halide.

In accordance with the above described method of the present invention, the highly crosslinked surface layer formed on the surface of the article is imparted with very high durability so that the thus treated shaped article can be free from the problem of bleeding or exudation of the plasticizer or other additive ingredients over a long period of time even when the article is used in an outdoor environment or under irradiation with ultraviolet light.

DETAILED DESCRIPTION OF THE PREFERRED EMBODIMENTS

The shaped article as the objective body of the inventive method if fabricated with a vinyl chloride-based resin, which is not limited to a homopolymeric polyvinyl chloride resin but various types of copolymeric resins are included provided that the main component, say, 50% by weight or more, is vinyl chloride. The comonomers to be copolymerized with vinyl chloride are exemplified by vinyl esters such as vinyl acetate, vinyl ethers, acrylic and methacrylic acids and esters thereof, maleic and fumaric acids and esters thereof, maleic anhydride, aromatic vinyl compounds such as styrene, vinylidene halides such as vinylidene chloride, acrylonitrile, methacrylonitrile and olefins such as ethylene and propylene.

The method of the present invention is most typically applicable for preventing bleeding of a plasticizer on the surface of a shaped article of a plasticized polyvinyl chloride resin. Accordingly, most of the objective shaped bodies in the inventive method contains one or more plasticizers. The plasticizers are not limited to those of specific types including plasticizers having various chemical structures such as esters of phthalic acid, e.g. dioctyl phthalate, dibutyl phthalate, butyl benzyl phthalate and the like, esters of aliphatic dibasic acids, e.g. dioctyl adipate, dibutyl sebacate and the like, esters of pentaerithritol, glycol esters, e.g. diethyleneglycol dibenzoate and the like, esters of fatty acids, e.g. methyl acetylricinolate and the like, esters of phosphoric acid, e.g. tricresyl phosphate, triphenyl phosphate and the like, epoxidated fatty oils, e.g. epoxidated soybean oil, epoxidated linseed oil and the like, esters of citric acid, e.g. acetyl tributyl citrate, acetyl trioctyl citrate and the like and polyester compounds such as trialkyl trimellitates, tetra-n-octyl pyromellitate, polypropylene adipate and the like.

In addition to the above mentioned plasticizers used for adjusting the flexibility or hardness of the shaped articles, various kinds of conventional additive ingredients may be contained in the shaped article according to need. For example, lubricants or stabilizers may be contained as exemplified by metal salts of a carboxylic acid such as calcium stearate, zinc stearate, lead stearate, barium stearate, cadmium stearate and the like, lead compounds such as tribasic lead sulfate, dibasic lead phosphite and the like, tin compounds such as dibutyltin dilaurate, di-n-octyltin maleate, di-n-octyltin mercaptide and the like, esters of fatty acids such as butyl stearate and the like, fatty acid amides such as ethylene bisstearoamide and the like, higher fatty acids and esters thereof and polyethylene waxes.

Additionally, the shaped article may contain fillers, heat-stability improvers, anti-oxidants, ultraviolet absorbers, anti-static agents, anti-fogging agents, pigments, dyes, cross-linking aids and other additives.

Further, the vinyl chloride-based resin may be a polymer blend of a polyvinyl chloride resin and one or more kinds of polymeric resins or rubbery elastomers in a limited amount of, for example, 50 parts by weight or smaller per 100 parts by weight of the polyvinyl chloride resin. The resins and rubbery elastomers suitable for such a polymer blend are exemplified by copolymers of ethylene and vinyl acetate, copolymers of acrylonitrile and butadiene, copolymers of styrene and acrylonitrile, copolymers of methyl methacrylate, styrene and butadiene, copolymers of acrylonitrile, styrene and butadiene, urethane elastomers, polyamide resins, ternary copolymers of ethylene, propylene and a dienic monomer, epoxy-modified polybutadiene resins and the like.

The method for fabricating the shaped articles with the above described vinyl chloride-based resins may be a conventional one hitherto used for the fabrication of a polyvinyl chloride resin according to the desired shapes of the articles as well as the properties of the resin composition formulated with various additive ingredients including extrusion molding, injection molding, calendering, inflation, compression molding and the like. The shape of the article is also not limitative insofar as uniformity in the plasma treatment is ensured.

The thus obtained shaped article of the vinyl chloride-based resin is then subjected to exposure on the surface to low temperature plasma. Low temperature plasma is readily generated by applying an electric power to the electrodes under a low pressure of, for example, 10 Torr or below. The frequency band of the electric power is not particularly limitative ranging from direct current to the so-called microwave regions but most conveniently the frequency band of a high frequency, for example, at 13.56 MHz is recommended due to the stability of the plasma discharge. The electric power for the plasma discharge is naturally determined according to the particular plasma generating apparatus but a power of 10 to 1000 watts is usually sufficient. The type of the plasma discharge may be of the electrode discharge or electrodeless discharge depending on the type of the electrodes which may be installed either inside the plasma chamber or outside the plasma chamber as well as a coiled electrode connected to the high frequency generator either by capacitive coupling or inductive coupling. At any rate, it is a requirement that the surface of the shaped article under treatment is not unduly heated by the heat of plasma discharge so as to be able to avoid thermal denaturation of the surface. The time necessary for the plasma treatment may differ widely depending on the conditions of treatment but, in most cases, sufficient results are obtained by the exposure for a time from a few seconds to several tens of minutes.

In the inventive method, the plasma gas, i.e. the gas forming the plasma atmosphere should be inorganic as exemplified by helium, neon, argon, nitrogen, nitrous oxide, nitrogen dioxide, oxygen, air, carbon monoxide, carbon dioxide, hydrogen, bromine cyanide, sulfur dioxide, hydrogen sulfide and the like. These gases may be used either singly or as a mixture of two kinds or more. The pressure of the plasma gas in the plasma chamber should be in the range from 0.001 Torr to 10 Torr or, preferably, from 0.05 Torr to 5 Torr in order to obtain good stability of the plasma discharge.

The next step of the inventive method is to bring the thus plasma-treated shaped article of the vinyl chloride-based resin into contact with a halogen or a hydrogen halide. The halogen or hydrogen halide may be liquid or gaseous according to the properties of them but the more convenient way is to use a gaseous halogen or hydrogen halide. When the halogen or hydrogen halide is not gaseous at room temperature under normal pressure such as bromine or iodine, it can be gasified by heating and/or reducing the pressure while gaseous halogens or hydrogen halides such as fluorine, hydrogen fluoride, chlorine, hydrogen chloride, hydrogen bromide, hydrogen iodide and the like can be liquefied by cooling and/or compressing.

When the halogen or hydrogen halide is used in a gaseous state, the pressure is desirably at least 10 Torr from the standpoint of obtaining a satisfactory efficiency of the treatment.

The halogen or hydrogen halide may be diluted, when it is gaseous, with an inert gas such as argon provided that the partial pressure of the halogen or hydrogen halide is at least 10 Torr. Further, the halogen or hydrogen halide may be used as dissolved in an inert solvent and the contacting of the plasma-treated article with the halogen or hydrogen halide is carried out by dipping the article in the solution of the halogen or hydrogen halide. The time of contacting with the halogen or hydrogen halide is of course dependent on various parameters such as pressure of the gas, temperature of the gas, surface temperature of the shaped article under treatment and so on but usually a time of several tens of seconds to several tens of minutes is sufficient in order to impart desired durability of the effect obtained by the preceding plasma treatment in relation to the anti-weathering and anti-ultraviolet resistance.

It should be noted that, in transferring the shaped article under treatment from the first step of the plasma treatment to the second step of contacting with the halogen or hydrogen halide, the shaped article under treatment must be prevented from contacting with oxygen or an oxygen-containing gas as far as possible, in particular, under a relatively high pressure such as atmospheric air in order to avoid the detrimental effect of oxygen on the desired effect of the inventive method.

It is further recommended that, when the plasma treatment and the contacting with a gaseous halogen or hydrogen halide are carried out in one and the same chamber, the plasma gas remaining in the chamber after completion of the plasma treatment is first evacuated to as high as possible vacuum and then the halogen or hydrogen halide gas is introduced into the chamber. This procedure is advantageous in avoiding the possible reaction between the plasma gas and the halogen or hydrogen halide as in the formation of phosgene by the reaction of chlorine and carbon monoxide as well as in avoiding decrease in the effect of the halogen or hydrogen halide by the reaction with the plasma-activated inorganic gas.

The above described method of the present invention is very advantageous in remarkably increasing the durability of the effects obtained by the low temperature plasma treatment for preventing migration and surface bleeding or exudation of the plasticizer and other additives contained in a shaped article of a vinyl chloride-based resin even when the shaped article is prolongedly used in a outdoor condition or irradiated with ultraviolet light ensuring excellent anti-weathering resistance.

In the following, the method of the present invention is described in further detail by way of examples and comparative examples.

EXAMPLE 1

A resin sheet was prepared with a resin composition composed of 100 parts by weight of a homopolymeric polyvinyl chloride resin, 50 parts by weight of di(2-ethylhexyl) phthalate as a plasticizer and 3 parts by weight of a calcium-zinc based stabilizer. This resin sheet was placed in a plasma chamber in which low temperature plasma was generated for 5 minutes by the glow discharge produced with application of a high frequency electric power of 100 watts at 13.56 MHz to the electrodes while the atmosphere inside the plasma chamber was controlled at a pressure of 0.5 Torr by passing carbon monoxide gas under a reduced pressure so as that the surface of the resin sheet was exposed to the low temperature plasma at 30° C.

The thus plasma-treated sheet was divided into two pieces, one of which was directly subjected to the determination of the amount of the plasticizer extractable with an organic solvent in a procedure as described below. The other piece of the plasma-treated sheet was then subjected to accelerated weathering for 100 hours in a weathering accelerator followed by the same extraction test of the plasticizer with the same organic solvent. The results are shown in Table 1.

Procedure for the determination of the amount of the plasticizer extractable with n-hexane: the resin sheet under test was placed on the bottom of a cylindrical extraction vessel of 100 ml capacity, into which 50 ml of n-hexane was introduced so as to be contacted with 26 cm$^2$ area of the sample sheet. The vessel was shaken at 37° C. for 2 hours and a portion of the n-hexane was taken and analyzed gas chromatographically to determine the amount of the plasticizer extracted in the solvent. The results are expressed in mg of the plasticizer per 26 cm$^2$ area.

EXAMPLE 2

The preparation of the resin sheet and the conditions of the plasma treatment were just the same as in Example 1. After completion of the plasma treatment, the plasma chamber was evacuated to a pressure of 0.01 Torr without taking out the plasma-treated resin sheet and then chlorine gas was introduced into the plasma chamber up to a pressure of 100 Torr where the resin sheet was kept for 10 minutes in contact with the chlorine gas with the above pressure maintained.

The thus plasma-treated and chlorine-contacted resin sheet was divided into two pieces and subjected to the extraction test of the plasticizer with an organic solvent in the same manner as in Example 1 either before or after the accelerated weathering. The results are shown in Table 1.

EXAMPLE 3

The preparation of the resin sheet and the conditions of the plasma treatment were just the same as in Example 1. After completion of the plasma treatment, the plasma-treated resin sheet was taken out of the plasma chamber and kept standing for 10 hours in atmospheric air. Thereafter, the resin sheet was placed in a vacuum chamber, which was evacuated to a pressure of 0.01 Torr and then filled with chlorine gas at a pressure of 100 Torr. The plasma-treated resin sheet was kept for 10 minutes in this condition so as to be contacted with the chlorine gas.

The thus plasma-treated and chlorine-contacted resin sheet was divided into two pieces and subjected to the extraction test of the plasticizer with an organic solvent in the same manner as in Example 1 either before or after the accelerated weathering. The results are shown in Table 1.

EXAMPLE 4

The formulation of the resin sheet was the same as in Example 1 except that 50 parts by weight of di(2-ethylhexyl) phthalate were replaced with 30 parts by weight of di(2-ethylhexyl) adipate. The resin sheet was placed in a plasma chamber in which low temperature plasma was generated for 5 minutes by the glow discharge produced with application of a high frequency electric power of 200 watts at 13.56 MHz to the electrodes while the atmosphere inside the plasma chamber was controlled at a pressure of 1 Torr by passing argon under a reduced pressure so as that the surface of the resin sheet was exposed to the low temperature plasma at 30° C.

The thus plasma-treated resin sheet was divided into two pieces and subjected to the extraction test of the plasticizer with an organic solvent in the same manner as in Example 1 either before or after the accelerated weathering. The results of the extracted amount of di(2-ethylhexyl) adipate are shown in Table 1.

EXAMPLE 5

The preparation of the resin sheet and the conditions of the plasma treatment were just the same as in Example 4. After completion of the plasma treatment, the plasma chamber was evacuated to a pressure of 0.01 Torr without taking out the plasma-treated resin sheet and then chlorine gas was introduced into the plasma chamber up to a pressure of 760 Torr where the resin sheet was kept for 5 minutes in contact with the chlorine gas.

The thus plasma-treated and chlorine-contacted resin sheet was divided into two pieces and subjected to the extraction test of the plasticizer with an organic solvent in the same manner as in Example 1 either before or after the accelerated weathering to give the results shown in Table 1.

EXAMPLE 6

The preparation of the resin sheet and the conditions of the plasma treatment were just the same as in Example 4. After completion of the plasma treatment, the plasma chamber was evacuated to a pressure of 0.01 Torr and then hydrogen bromide gas was introduced into the plasma chamber up to a pressure of 100 Torr where the resin sheet was kept for 15 minutes in contact with the hydrogen bromide.

The thus obtained resin sheet treated with low temperature plasma and then contacted with hydrogen bromide was divided into two pieces and subjected to the extraction test of the plasticizer with an organic solvent in the same manner as in Example 1 either before or after the accelerated weathering to give the results shown in Table 1 below.

TABLE 1

| Example No. | Plasma gas | Halogen or hydrogen halide | Extracted plasticizer, mg/26 cm$^2$ | |
|---|---|---|---|---|
| | | | Before accelerated weathering | After accelerated weathering |
| 1 | Carbon monoxide | None | 0 | 45 |
| 2 | Carbon monoxide | Chlorine | 0 | 2 |
| 3 | Carbon monoxide | Chlorine | 0 | 7 |
| 4 | Argon | None | 0 | 59 |
| 5 | Argon | Chlorine | 0 | 3 |
| 6 | Argon | Hydrogen bromide | 0 | 2 |

What is claimed is:
1. A method for modifying surface properties of a shaped article of a vinyl chloride-based resin which comprises the steps of

(a) exposing the surface of a shaped article of a vinyl chloride-based resin to an atmosphere of low temperature plasma of an inorganic plasma gas under a pressure not exceeding 10 Torr, and (b) contacting the thus plasma-treated surface of the shaped article with a halogen or a hydrogen halide.

2. The method as claimed in claim 1 wherein the inorganic plasma gas is selected from the group consisting of helium, neon, argon, nitrogen, nitrous oxide, nitrogen dioxide, oxygen, air, carbon monoxide, carbon dioxide, hydrogen, bromine cyanide, sulfur dioxide and hydrogen sulfide.

3. The method as claimed in claim 1 wherein the pressure of the atmosphere of the low temperature plasma of the inorganic gas is in the range from 0.001 Torr to 10 Torr.

4. The method as claimed in claim 1 wherein the halogen or hydrogen halide is in a gaseous state.

5. The method as claimed in claim 3 wherein the pressure of the gaseous halogen or hydrogen halide is at least 10 Torr.

6. The method as claimed in claim 1 wherein the plasma-treated surface of the shaped article is prevented from contacting with oxygen or an oxygen-containing gas before contacting with the halogen or hydrogen halide.

7. The method as claimed in claim 4 wherein the step (a) and the step (b) are carried out in one and the same chamber and the inorganic plasma gas in the chamber is evacuated after completion of the step (a) before introducing the halogen or hydrogen halide in a gaseous state into the chamber.

* * * * *